US 9,969,643 B2

(12) United States Patent
Darcangelo

(10) Patent No.: US 9,969,643 B2
(45) Date of Patent: May 15, 2018

(54) APPARATUS AND METHOD FOR FORMING A GLASS SHEET

(71) Applicant: CORNING INCORPORATED, Corning, NY (US)

(72) Inventor: Charles Michael Darcangelo, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days. days.

(21) Appl. No.: 15/033,259

(22) PCT Filed: Oct. 29, 2014

(86) PCT No.: PCT/US2014/062802
§ 371 (c)(1),
(2) Date: Apr. 29, 2016

(87) PCT Pub. No.: WO2015/066120
PCT Pub. Date: May 7, 2015

(65) Prior Publication Data
US 2016/0272528 A1 Sep. 22, 2016

Related U.S. Application Data

(60) Provisional application No. 61/898,859, filed on Nov. 1, 2013.

(51) Int. Cl.
C03B 17/06 (2006.01)
C03B 33/02 (2006.01)
C03B 17/02 (2006.01)

(52) U.S. Cl.
CPC ............ C03B 17/065 (2013.01); C03B 17/02 (2013.01); C03B 17/064 (2013.01); C03B 17/068 (2013.01); C03B 33/0215 (2013.01)

(58) Field of Classification Search
None
See application file for complete search history.

(56) References Cited

U.S. PATENT DOCUMENTS 1,934,798 A 11/1933 Gelstharp
3,737,294 A 6/1973 Dumbaugh, Jr. et al.
(Continued)

FOREIGN PATENT DOCUMENTS

CN 201746443 U 2/2011
ES 2085225 A2 5/1996
(Continued)

OTHER PUBLICATIONS

The International Search Report and Written Opinion, dated Feb. 18, 2015, pp. 1-13, International Application No. PCT/US2014/062802, International filing date Oct. 29, 2014, European Patent Office, The Netherlands.

Primary Examiner — Lisa L Herring

(57) ABSTRACT

A method includes forming a continuous ribbon of glass. The continuous ribbon includes a first surface, a second surface opposite the first surface, a first edge region, a second edge region opposite the first edge region, and a central region extending between the first edge region and the second edge region. Each of the first edge region and the second edge region has a greater thickness than the central region of the continuous ribbon. An indented pattern is formed longitudinally along the first edge region of the continuous ribbon by forming a first series of indentations in the first surface of the continuous ribbon and forming a second series of indentations in the second surface of the continuous ribbon. The indented pattern includes intermediate segments interconnected with one another by webs. Each intermediate segment is thicker than adjacent webs.

14 Claims, 5 Drawing Sheets

(56) References Cited

U.S. PATENT DOCUMENTS

| | | | |
|---|---|---|---|
| 3,931,438 A | 1/1976 | Beall et al. | |
| 4,102,664 A | 7/1978 | Dumbaugh, Jr. | |
| 4,157,908 A | 6/1979 | Gagne | |
| 4,214,886 A | 7/1980 | Shay et al. | |
| 5,342,426 A | 8/1994 | Dumbaugh, Jr. | |
| 5,559,060 A | 9/1996 | Dumbaugh, Jr. et al. | |
| 6,502,423 B1 * | 1/2003 | Ostendarp | C03B 17/06 65/100 |
| 7,201,965 B2 | 4/2007 | Gulati et al. | |
| 7,514,149 B2 | 4/2009 | Bocko et al. | |
| 8,007,913 B2 | 8/2011 | Coppola et al. | |
| 2004/0197575 A1 * | 10/2004 | Bocko | B32B 17/06 428/432 |
| 2006/0127679 A1 * | 6/2006 | Gulati | B32B 17/06 428/426 |
| 2009/0019892 A1 | 1/2009 | Fredholm et al. | |
| 2010/0024928 A1 | 2/2010 | Shkolnikov et al. | |
| 2010/0043495 A1 * | 2/2010 | Kirby | C03B 17/06 65/91 |
| 2010/0212361 A1 | 8/2010 | Abramov et al. | |
| 2011/0100057 A1 | 5/2011 | Gaylo | |
| 2011/0167873 A1 * | 7/2011 | Anderson | C03B 17/068 65/91 |
| 2011/0239708 A1 | 10/2011 | Nishiura et al. | |
| 2012/0159989 A1 | 6/2012 | Shiraishi et al. | |
| 2013/0230276 A1 | 9/2013 | Lee | |
| 2016/0115067 A1 * | 4/2016 | De Angelis | C03B 17/064 65/29.12 |
| 2016/0159677 A1 * | 6/2016 | Coppola | C03C 3/087 65/53 |

FOREIGN PATENT DOCUMENTS

| | | | |
|---|---|---|---|
| JP | 2012131661 A * | 7/2012 | |
| WO | 2012158232 A2 | 11/2012 | |
| WO | WO 2014186196 A1 * | 11/2014 | C03B 5/04 |
| WO | WO 2015016935 A1 * | 2/2015 | C03B 17/02 |

* cited by examiner

APPARATUS AND METHOD FOR FORMING A GLASS SHEET

This application claims the benefit of priority under 35 U.S.C. § 371 of International Application No. PCT/US2014/062802, filed on Oct. 29, 2014, which claims the benefit of priority under 35 U.S.C. § 119 U.S. Provisional Application No. 61/898,859, filed on Nov. 1, 2013, the content of each of which is relied upon and incorporated herein by reference in its entirety.

BACKGROUND

This disclosure relates to glass sheets, and more particularly to an apparatus and method for forming a glass sheet.

A moving ribbon of glass may be formed using a variety of different processes. The moving ribbon of glass may be severed to form a glass sheet. The glass sheet may be further processed (e.g., during a cutting or molding process) to form a glass article.

SUMMARY

In one embodiment, a method comprises forming a continuous ribbon of glass. The continuous ribbon comprises a first surface, a second surface opposite the first surface, a first edge region, a second edge region opposite the first edge region, and a central region extending between the first edge region and the second edge region. Each of the first edge region and the second edge region comprises a greater thickness than the central region of the continuous ribbon. An indented pattern is formed longitudinally along the first edge region of the continuous ribbon by forming a first series of indentations in the first surface of the continuous ribbon and forming a second series of indentations in the second surface of the continuous ribbon. The indented pattern comprises intermediate segments interconnected with one another by webs. Each intermediate segment is thicker than adjacent webs.

In another embodiment, a method comprises forming a continuous ribbon of glass. The continuous ribbon comprises a laminate structure comprising a core layer disposed between a first cladding layer and a second cladding layer. A first edge region of the continuous ribbon is passed between a first patterning roller and a second patterning roller. Each of the first patterning roller and the second patterning roller comprises a series of protrusions successively engaging the continuous ribbon as the continuous ribbon is passed between the first patterning roller and the second patterning roller. The first patterning roller and the second patterning roller are synchronized such that each protrusion of the first patterning roller engages the first cladding layer of the continuous ribbon at substantially the same longitudinal position on the continuous ribbon as a corresponding protrusion of the second patterning roller engages the second cladding layer of the continuous ribbon to form a series of thinned regions longitudinally along the first edge region of the continuous ribbon.

In another embodiment, an apparatus comprises a forming unit and a patterning unit. The forming unit is configured to form a continuous ribbon of glass. The patterning unit comprises a first patterning member and a second patterning member. The first patterning member and the second patterning member are positioned such that, upon passage of the continuous ribbon through a space between the first patterning member and the second patterning member, the first patterning member is engageable with a first surface of the continuous ribbon and the second patterning member is engageable with a second surface of the continuous ribbon opposite the first surface. Each of the first patterning member and the second patterning member comprises a protrusion. The first patterning member and the second patterning member are synchronized such that the protrusion of the first patterning member and the protrusion of the second patterning member are concurrently engageable with the first surface and the second surface, respectively, of the continuous ribbon at substantially the same transverse and longitudinal positions on the continuous ribbon.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
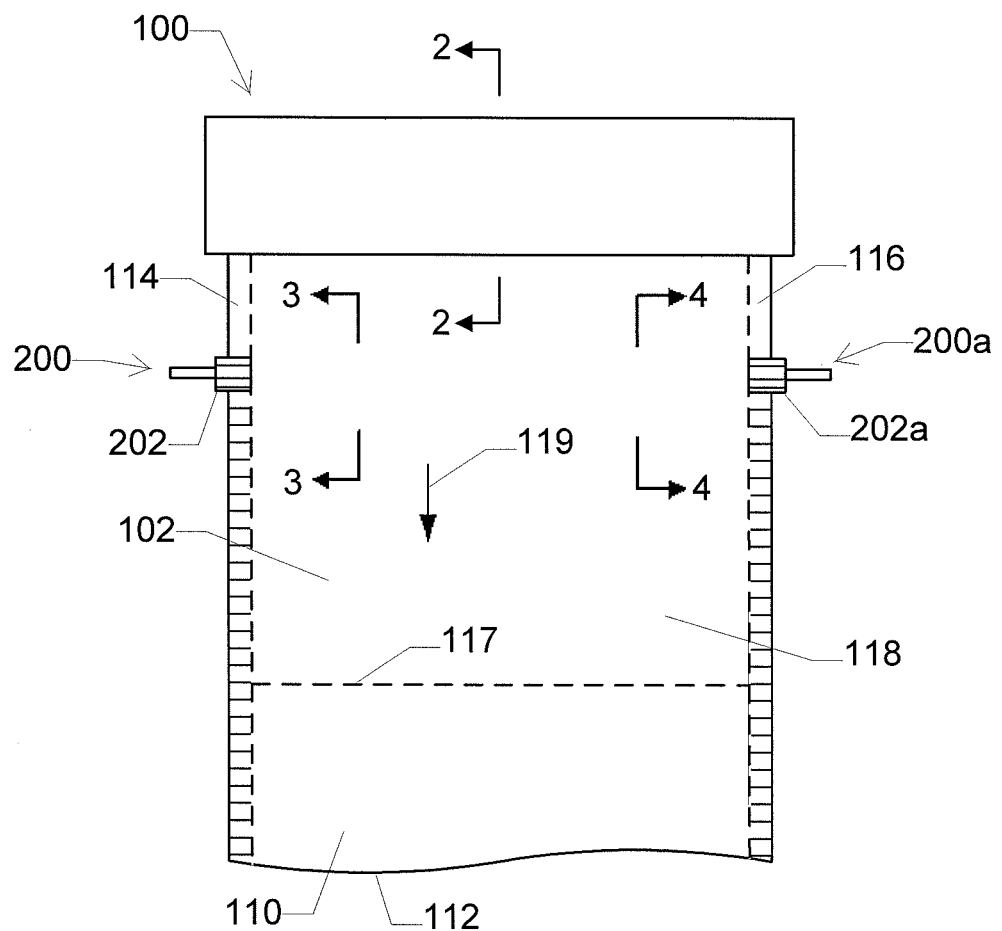
FIG. 1 is an elevation view of one exemplary embodiment of a system for forming a glass ribbon.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

FIG. 1 schematically illustrates a system for forming a continuous ribbon such as, for example, a glass ribbon. The ribbon can be severed to cut a sheet from the ribbon. The sheet can be substantially planar (e.g., a flat glass sheet) or non-planar (e.g., a curved glass sheet). The system comprises a forming unit 100 and a patterning unit 200. In some embodiments, the forming unit 100 is configured to form a continuous ribbon as shown in FIG. 1. In some embodiments, the patterning unit 200 is configured to selectively reduce the thickness of a portion of the continuous ribbon to aid in severing the continuous ribbon to separate a sheet from the continuous ribbon.

Figure 2:
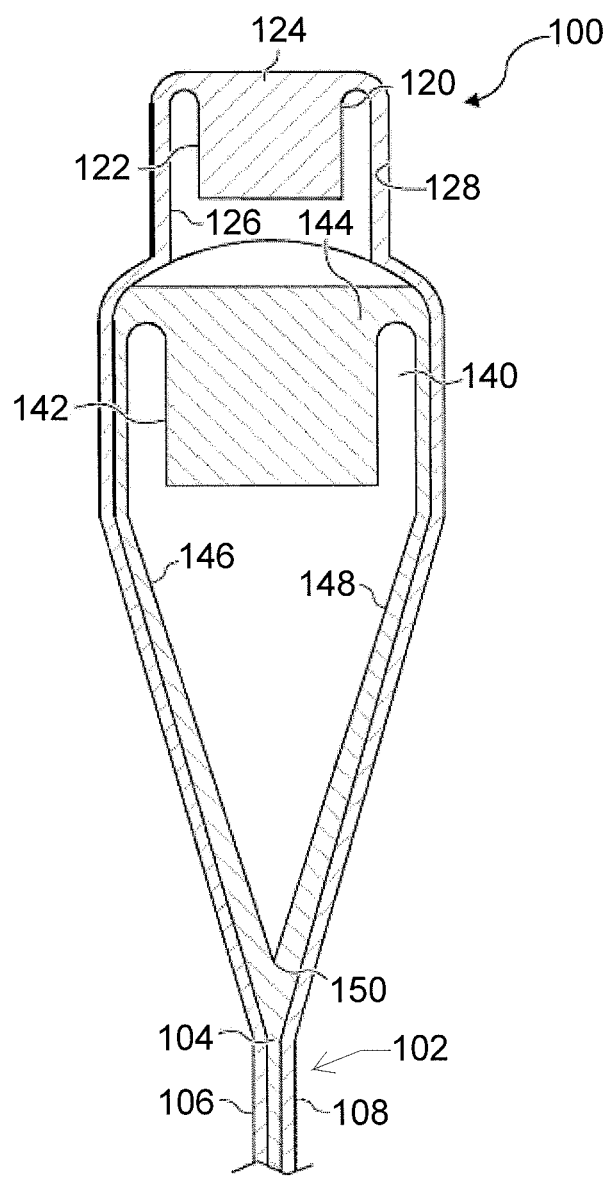
FIG. 2 is a cross sectional view of one exemplary embodiment of a forming unit taken along line 2-2 of FIG. 1.

In any of the embodiments described herein, the continuous ribbon and the sheet can comprise one or more glass materials, one or more glass-ceramic materials, or combinations thereof. The continuous ribbon can be formed using any suitable process such as, for example, fusion-draw, down-draw, up-draw, slot-draw, or float processes. FIG. 2 illustrates a cross sectional view of one exemplary embodiment of the forming unit 100 taken along line 2-2 of FIG. 1. In some embodiments, the forming unit 100 is used to form a continuous ribbon 102 of laminated glass using a fusion-draw process as shown in FIG. 2. To that end, in some of such embodiments, the apparatus 100 is configured generally as described in U.S. Pat. No. 4,214,886, which is incorporated herein by reference in its entirety. For example, the apparatus 100 comprises an upper overflow distributor 120 positioned above a lower overflow distributor 140. The upper overflow distributor 120 comprises a trough 122. A glass composition 124 is melted and fed into the trough 122 in a viscous state. The lower overflow distributor 140 comprises a trough 142. A glass composition 144 is melted and fed into the trough 142 in a viscous state.

The glass composition 144 overflows the trough 142 and flows down opposing outer forming surfaces 146 and 148 of the lower overflow distributor 140. The outer forming surfaces 146 and 148 converge at a draw line 150. The separate streams of the glass composition 144 flowing down the respective outer forming surfaces 146 and 148 of the lower overflow distributor 140 converge at the draw line 150 where they are fused together to form a core layer 104 of the continuous ribbon 102.

The glass composition 124 overflows the trough 122 and flows down opposing outer forming surfaces 126 and 128 of the upper overflow distributor 120. The glass composition 124 is deflected outward by the upper overflow distributor 120 such that the glass composition 124 flows around the lower overflow distributor 140 and contacts the glass composition 144 flowing over the outer forming surfaces 146 and 148 of the lower overflow distributor. The separate streams of the glass composition 124 are fused to the respective separate streams of the glass composition 144 flowing down the respective outer forming surfaces 146 and 148 of the lower overflow distributor 140. Upon convergence of the streams of the glass composition 144 at the draw line 150, the glass composition 124 forms a first cladding layer 106 and a second cladding layer 108 of the continuous ribbon 102. The continuous ribbon 102 travels away from the draw line 150 of the lower overflow distributor 140 as shown in FIG. 2. In some embodiments, the continuous ribbon 102 cools as it travels away from the lower overflow distributor 140. Upon cooling, the continuous ribbon 102 becomes brittle. In some embodiments, the continuous ribbon 102 cools and/or becomes brittle prior to being severed to separate a glass sheet from the continuous ribbon.

The core layer 104 is disposed between the cladding layers 106 and 108. In some embodiments, the cladding layers 106 and 108 are exterior layers as shown in FIG. 2. The core layer 104 comprises a first major surface and a second major surface opposite the first major surface. In some embodiments, the first cladding layer 106 is fused to the first major surface of the core layer 104. Additionally, or alternatively, the second cladding layer 108 is fused to the second major surface of the core layer 104. In some embodiments, the interface between the first cladding layer 106 and the core layer 104 and/or between the second cladding layer 108 and the core layer 104 is substantially free of any bonding material such as, for example, an adhesive, a coating layer, or any other material added or configured to adhere the respective cladding layer to the core layer. In this manner, one or both of the cladding layers 106 and 108 is fused directly to the core layer 104.

In some embodiments, the continuous ribbon 102 comprises a continuous ribbon of strengthened glass. In some of such embodiments, the continuous ribbon 102 is severed, as further described below, to form a sheet of strengthened glass. In some embodiments, the cladding layers 106 and 108 are formed from a glass composition having a different average coefficient of thermal expansion (CTE) than the core layer 104. For example, the glass composition 124 that forms the cladding layers 106 and 108 has a lower CTE than the glass composition 144 that forms the core layer 104. The mismatched CTE (i.e., the difference between the CTE of the cladding layers 106 and 108 and the CTE of the core layer 104) results in formation of compressive stress in the cladding layers and/or tensile stress in the core layer 104 upon cooling of the continuous ribbon 102.

Although the continuous ribbon 102 illustrated in FIG. 2 comprises three layers, other embodiments are included within the scope of this disclosure. In other embodiments, a continuous ribbon comprises a plurality of layers, such as, for example, two, four, or more layers. In embodiments in which the continuous ribbon comprises more than three layers, one or more intermediate layers are disposed between the core layer and one of the cladding layers. Thus, in some embodiments, the cladding layers are exterior layers regardless of the total number of layers included in the continuous ribbon. In other embodiments the continuous ribbon comprises a single layer, i.e., the continuous ribbon is non-laminated.

Returning to FIG. 1, the continuous ribbon 102 comprises a first surface 110 and a second surface 112 opposite the first surface. A first edge region 114 extends in a longitudinal direction along a length of the continuous ribbon 102 adjacent to a first side edge of the continuous ribbon. A second edge region 116 extends in the longitudinal direction along the length of the continuous ribbon 102 adjacent to a second side edge of the continuous ribbon opposite the first side edge. A central region 118 of the continuous ribbon 102 is disposed between the first edge region 114 and the second edge region 116. In some embodiments, the central region 118 is thinner than the first edge region 114 and/or the second edge region 116. For example, in some of such embodiments, the first edge region 114 and/or the second edge region 116 comprises a respective bead extending along the length of the continuous ribbon 102. The beads can be relatively thick regions formed near the side edges of the continuous ribbon 102. In some embodiments, the beads are thicker than the central region 118 of the continuous ribbon 102. In some embodiments, the continuous ribbon 102 moves in a traveling direction 119 at a traveling velocity v. In some of such embodiments, the traveling direction 119 is a downward direction. The continuous ribbon 102 moves downward away from the forming unit 100 (e.g., under the force of gravity and/or one or more pulling rollers).

The thickness of the beads can make severing the first edge region 114 and/or the second edge region 116 of the continuous ribbon 102 (e.g., to cut a sheet from the ribbon) difficult. In some embodiments, the patterning unit 200 selectively reduces the thickness of a portion of the continuous ribbon 102 to aid in severing the continuous ribbon. For example, in some embodiments, the patterning unit 200 engages the continuous ribbon 102 at the first edge region 114 to selectively reduce the thickness of the bead extending along the first edge region by forming an indented pattern along the first edge region. Additionally, or alternatively, the patterning unit 200 engages the continuous ribbon 102 at the second edge region 116 to selectively reduce the thickness of the bead extending along the second edge region by forming an indented pattern along the second edge region.

Figure 3:
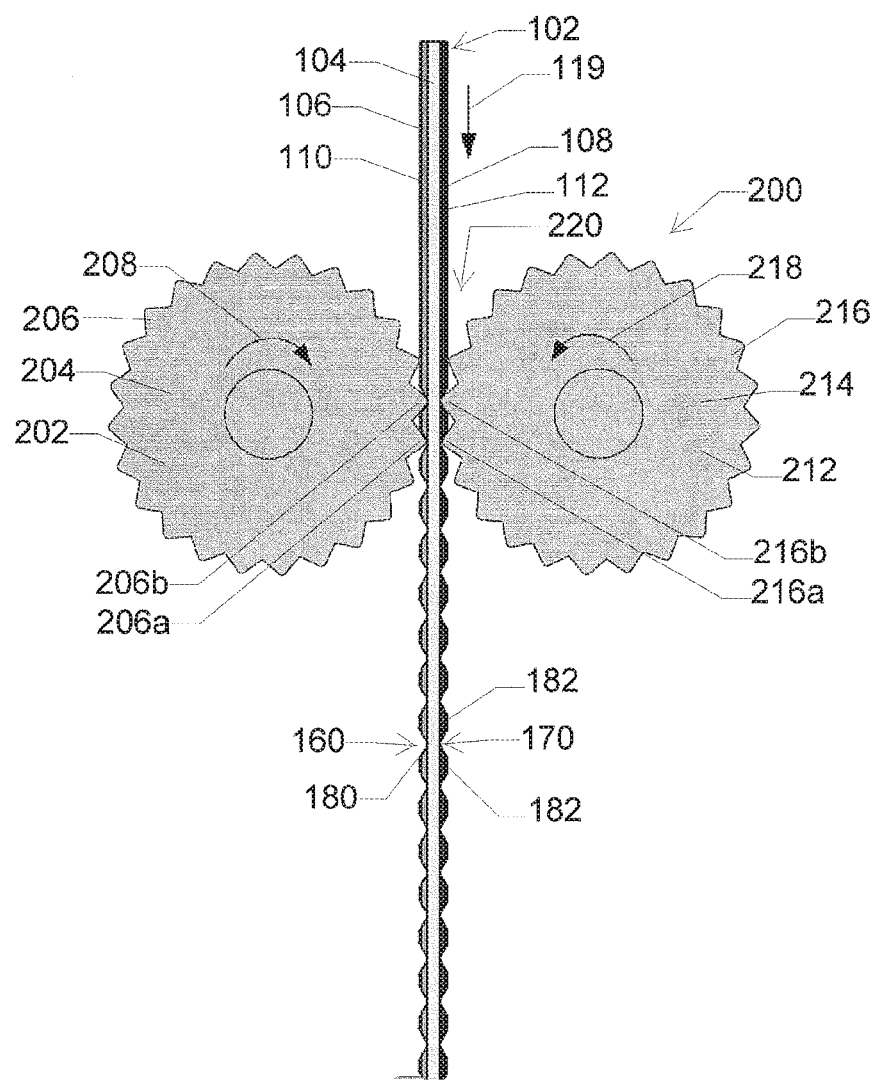
FIG. 3 is a cross sectional view of one exemplary embodiment of a pair of patterning members engaged with a glass ribbon taken along line 3-3 of FIG. 1.

FIG. 3 shows a cross sectional view of one exemplary embodiment of the patterning unit 200 taken along line 3-3 of FIG. 1. The patterning unit 200 comprises a first patterning member 202 and a second patterning member 212 as shown in FIGS. 1 and 3. The continuous ribbon 102 is passed through a space 220 between the first patterning member 202 and the second patterning member 212 to form the indented pattern in the continuous ribbon as further described below.

In some embodiments, the first patterning member 202 comprises a patterning roller (e.g., a serrated or ribbed roller). For example, the first patterning member 202 comprises a roller body 204 and an outward protrusion 206. The protrusion 206 engages the continuous ribbon 102 to form an indentation in the continuous ribbon. In some embodiments, the roller body 204 has a substantially cylindrical shape as shown in FIGS. 1 and 3. In other embodiments, the roller body can have any other suitable shape (e.g., a triangular prism, a rectangular prism, or any other 3-dimensional shape). In some embodiments, the protrusion 206 extends along a length of the roller body 204 and outward from the outer surface of the roller body. In some embodiments, the protrusion 206 comprises a ridge extending along the length of the roller body 204 between a first end and a second end of the roller body. In some embodiments, the protrusion 206 comprises a plurality of protrusions disposed circumferentially about the outer surface of the roller body 204 and extending outward from the outer surface as shown in FIGS. 1 and 3.

In some embodiments, the second patterning member 212 comprises a patterning roller (e.g., a serrated or ribbed roller). For example, the second patterning member 212 comprises a roller body 214 and an outward protrusion 216. The protrusion 216 engages the continuous ribbon 102 to form an indentation in the continuous ribbon. In some embodiments, the roller body 214 has a substantially cylindrical shape as shown in FIGS. 1 and 3. In other embodiments, the roller body can have any other suitable shape as described above with reference to the first patterning member 202. In some embodiments, the protrusion 216 extends along a length of the roller body 214 and outward from the outer surface of the roller body. In some embodiments, the protrusion 216 comprises a ridge extending along the length of the roller body 214 between a first end and a second end of the roller body. In some embodiments, the protrusion 216 comprises a plurality of protrusions disposed circumferentially about the outer surface of the roller body 214 and extending outward from the outer surface as shown in FIGS. 1 and 3.

In some embodiments, the first patterning member 202 and the second patterning member 212 are positioned to engage opposing surfaces of the continuous ribbon 102. For example, the first patterning member 202 is positioned to engage the first surface 110 of the continuous ribbon 102, and the second patterning member 212 is positioned to engage the second surface 112 of the continuous ribbon. In some embodiments, the first patterning member 202 and the second patterning member 212 are aligned with one another in the longitudinal direction (e.g., vertically aligned). In other words, the first patterning member 202 and the second patterning member 212 are at substantially the same transverse position along the width of the continuous ribbon 102. In some embodiments, each of the first patterning member 202 and the second patterning member 212 is aligned with the first edge region 114 of the continuous ribbon 102 as shown in FIG. 1. Additionally, or alternatively, the first patterning member 202 and the second patterning member 212 are aligned with one another in a transverse direction (e.g., horizontally aligned). In other words, the first patterning member 202 and the second patterning member 212 are at substantially the same longitudinal position along the length of the continuous ribbon 102 as shown in FIG. 3. In some embodiments, the first patterning member 202 and the second patterning member 212 are aligned with one another in the longitudinal and transverse directions, for example, along the width and the length of the continuous ribbon 102 as shown in FIGS. 1 and 3. In some embodiments, the first patterning member 202 and the second patterning member 212 are vertically and horizontally aligned with one another. In this manner, the first patterning member 202 and the second patterning member 212 are engageable with the first surface 110 and the second surface 112, respectively, of the continuous ribbon 102 at substantially the same transverse and longitudinal positions along the width and the length of the continuous ribbon.

In the embodiment shown in FIG. 3, the first patterning member 202 and the second patterning member 212 are positioned directly opposite one another with the space 220 therebetween. The continuous ribbon 102 is passed through the space 220. For example, the continuous ribbon 102 moves in the traveling direction 119 through the space 220. Upon passage of the continuous ribbon 102 through the space 220, the first patterning member 202 engages the first surface 110 of the continuous ribbon, and the second patterning member 212 engages the second surface 112 of the continuous ribbon. In some embodiments, the patterning unit 200 is positioned downstream of (e.g., below) the forming unit 100 and close enough to the forming unit that the continuous ribbon 102 is in a viscous state as the continuous ribbon is engaged by the first patterning member 202 and the second patterning member 212 to form indentations in the continuous ribbon. For example, the patterning unit 200 is positioned to engage the continuous ribbon 102 in a region in which the temperature of the continuous ribbon is sufficiently high that the continuous ribbon is deformable to form the indentations therein and sufficiently low that the continuous ribbon maintains the general shape thereof (e.g., below a softening temperature of the continuous ribbon).

In the embodiment shown in FIG. 3, the first patterning member 202 is rotatable about an axis of rotation in a first rotational direction 208. In some embodiments, the first patterning member 202 is driven to rotate (e.g., by an electric motor) in the first rotational direction 208. The first patterning member 202 can pull the continuous ribbon 102 in the direction 119 away from the forming unit 100, which can aid in imparting desired characteristics (e.g., thickness, width, and/or shape) to the continuous ribbon. Alternatively, the first patterning member 202 can be driven such that the speed of the outer surface of the patterning member is substantially the same as the velocity v of the moving ribbon at the longitudinal position of the first patterning member so that the first patterning member does not substantially pull the continuous ribbon in the direction 119. In other embodiments, such rotation is caused by engagement with the continuous ribbon 102 moving through the space 220. The protrusions 206 of the first patterning member 202 successively engage the first surface 110 of the continuous ribbon 102 as the continuous ribbon is passed through the space 220. For example, in some embodiments, a first protrusion 206a engages the first surface 110 of the continuous ribbon 102 at a first longitudinal position. Engagement of the continuous ribbon 102 by the first protrusion 206a of the first patterning member 202 forms a first indentation in the first surface 110 of the continuous ribbon at the first longitudinal position. The indentation can have a size and shape corresponding to the size and shape of the protrusion 206.

The continuous ribbon 102 moves in the traveling direction 119, and the first patterning member 202 rotates in the first rotational direction 208 until a second protrusion 206b adjacent to the first protrusion 206a engages the first surface 110 of the continuous ribbon at a second longitudinal position. Engagement of the continuous ribbon 102 by the second protrusion 206b of the first patterning member 202 forms a second indentation in the first surface 110 of the continuous ribbon at the second longitudinal position. The second longitudinal position is upstream of (e.g., above) the first longitudinal position. The second indentation is adjacent to the first indentation. Upon continued movement of the continuous ribbon 102 in the traveling direction 119 and continued rotation of the first patterning member 202 in the first rotational direction 208, the protrusions 206 of the first patterning member successively engage the first surface 110 of the continuous ribbon to form a first series of indentations in the first surface of the continuous ribbon. In some embodiments, the first series of indentations extends longitudinally along the length of the first edge region 114 of the continuous ribbon 102.

Similarly, the second patterning member 212 is rotatable about an axis of rotation in a second rotational direction 218. The second patterning member 212 can be driven to rotate and/or can be caused to rotate by engagement with the continuous ribbon 102 moving through the space 220. The protrusions 216 of the second patterning member 212 successively engage the second surface 112 of the continuous ribbon 102 as the continuous ribbon is passed through the space 220. Thus, a first protrusion 216a engages the second surface 112 of the continuous ribbon 102 at the first longitudinal position. Engagement of the continuous ribbon 102 by the first protrusion 216a of the second patterning member 212 forms a first indentation in the second surface 112 of the continuous ribbon at the first longitudinal position.

The continuous ribbon 102 moves in the traveling direction 119, and the second patterning member 212 rotates in the second rotational direction 218 until a second protrusion 216b adjacent to the first protrusion 216a engages the second surface 112 of the continuous ribbon at the second longitudinal position. Engagement of the continuous ribbon 102 by the second protrusion 216b of the second patterning member 212 forms a second indentation in the second surface 112 of the continuous ribbon at the second longitudinal position. Upon continued movement of the continuous ribbon 102 in the traveling direction 119 and continued rotation of the second patterning member 212 in the second rotational direction 218, the protrusions 216 of the second patterning member successively engage the second surface 112 of the continuous ribbon to form a second series of indentations in the second surface of the continuous ribbon. In some embodiments, the second series of indentations extends longitudinally along the length of the first edge region 114 of the continuous ribbon 102.

In some embodiments, the first patterning member 202 and/or the second patterning member 212 extend substantially perpendicular to a longitudinal axis of the continuous ribbon 102 (e.g., substantially perpendicular to the traveling direction 119). In this manner, the indentations of the first and/or second series of indentations extend substantially perpendicular to the longitudinal axis of the continuous ribbon. In other embodiments, the first and/or second patterning members extend in a direction that is non-perpendicular to the longitudinal axis of the continuous ribbon. In such embodiments, the first and/or second patterning members are angled relative to the direction that is perpendicular to the longitudinal axis. In this manner, the indentations of the first and/or second series of indentations extend in the direction that is not perpendicular to the longitudinal axis of the continuous ribbon. This can aid in pulling the continuous ribbon in the transverse direction with the patterning members (e.g., to control the width of the continuous ribbon).

In some embodiments, the protrusions of the first patterning member 202 and/or the second patterning member 212 extend substantially parallel to a longitudinal axis of the patterning member as shown in FIG. 1. In other embodiments, the protrusions of the first patterning member and/or the second patterning member extend in a direction that is non-parallel to the longitudinal axis of the patterning member. For example, in some embodiments, the protrusions of the first patterning member and/or the second patterning member extend in a spiral or helical pattern about the patterning member (e.g., about the roller body). The indentations formed by such patterning members extends in the transverse and longitudinal directions (e.g., diagonally) along the respective edge region of the continuous ribbon. Regardless of the orientation of the indentations, corresponding indentations in the first surface and the second surface of the continuous ribbon can be aligned with one another to form the thinned regions or webs therebetween. The spiral pattern can aid in pulling the continuous ribbon in the transverse direction upon rotation of the patterning member (e.g., to control the width of the continuous ribbon).

In some embodiments, the first patterning member 202 and the second patterning member 212 are synchronized with one another such that a protrusion 206 of the first patterning member engages the first surface 110 of the continuous ribbon 102 at substantially the same time as and/or directly opposite to the position at which a corresponding protrusion 216 of the second patterning member engages the second surface 112 of the continuous ribbon. In some embodiments, a protrusion 206 of the first patterning member 202 and a corresponding protrusion 216 of the second patterning member 212 engage the first surface 110 and the second surface 112, respectively, of the continuous ribbon 102 concurrently with one another. In some embodiments, the protrusion 206 of the first patterning member 202 and the corresponding protrusion 216 of the second patterning member 212 engage the continuous ribbon 102 at substantially the same transverse and longitudinal positions (e.g., along the width and the length of the ribbon). In this manner, the first series of indentations formed in the first surface 110 of the continuous ribbon 102 (e.g., by the protrusions 206 of the first patterning member 202) is aligned with the second series of indentations formed in the second surface 112 of the continuous ribbon (e.g., by the protrusions 216 of the second patterning member 212). In some embodiments, each indentation in the first surface 110 of the continuous ribbon 102 is disposed directly opposite a corresponding indentation in the second surface 112 of the continuous ribbon. A thinned region or web results from each indentation in the first surface 110 of the continuous ribbon 102 and the corresponding indentation in the second surface 112 of the continuous ribbon. Such structure can aid in severing the first edge region 114 of the continuous ribbon.

FIG. 3 shows the first series of indentations formed in the first surface 110 of the continuous ribbon 102 and the second series of indentations formed in the second surface 112 of the continuous ribbon. In some embodiments, the first series of indentations is aligned with the second series of indentations as described above. An indentation 160 of the first series of indentations is disposed directly opposite a corresponding indentation 170 of the second series of indentations. In some embodiments, the indentation 160 comprises a channel or a groove formed in the first surface 110 of the continuous ribbon 102. In some of such embodiments, the indentation 160 extends in a transverse direction substantially perpendicular to the traveling direction 119. The indentation 160 extends along at least a portion of a width of the first edge region 114. For example, the indentation 160 extends at least partially across the bead of the first edge region 114. Similarly, the corresponding indentation 170 comprises a channel or a groove formed in the second surface 112 of the continuous ribbon 102. In some embodiments, the corresponding indentation 170 extends in the transverse direction substantially perpendicular to the traveling direction 119. The corresponding indentation 170 extends along at least a portion of the width of the first edge region 114. For example, the corresponding indentation 170 extends at least partially across the bead of the first edge region 114.

In some embodiments, the indentation 160 and the corresponding indentation 170 are disposed opposite one another on opposing surfaces of the continuous ribbon 102 and aligned with one another (e.g., horizontally and vertically aligned). Upon formation of the indentation 160 and the corresponding indentation 170 in the first edge region 114, the first edge region 114 comprises a thinned region formed between the indentation 160 and the corresponding indentation 170. In some embodiments, the thickness of the bead extending along the length of the first edge region 114 is selectively reduced at the position (e.g., the transverse position and/or the longitudinal position) of the indentation 160 and the corresponding indentation 170. A resulting web 180 is disposed between the indentation 160 and the corresponding indentation 170. The web 180 is aligned (e.g., horizontally and vertically aligned) with the indentation 160 and the corresponding indentation 170. The web 180 is thinner than intermediate segments 182 of the first edge region 114 of the continuous ribbon 102. The intermediate segments are disposed between the webs at different longitudinal positions than the webs. For example, the intermediate segments 182 are misaligned with the indentations in the transverse direction (e.g., horizontally misaligned). In some embodiments, the intermediate segments are disposed at substantially the same transverse positions as the webs. For example, the intermediate segments 182 are aligned with the indentations in the longitudinal direction (e.g., vertically aligned). The intermediate segments 182 comprise portions of the first edge region 114 positioned upstream and downstream of the web 180 between adjacent indentations.

In some embodiments, the thickness of the webs 180 is less than or equal to an initial thickness of the central region 118 of the continuous ribbon 102 at a longitudinal position upstream of the patterning unit 200. Additionally, or alternatively, the thickness of the intermediate segments 182 is greater than an initial thickness of the first edge region 114 at the longitudinal position upstream of the patterning unit 200. In some embodiments, the patterning unit 200 thins the first edge region 114 at the webs 180 and thickens the first edge region at the intermediate segments 182 (e.g., as material displaced at the webs is pushed to the intermediate segments).

In some embodiments, upon passage of the continuous ribbon 102 between the first patterning member 202 and the second patterning member 212, the first series of indentations is formed in the first surface 110 of the continuous ribbon, and the second series of indentations is formed in the second surface 112 of the continuous ribbon. In this manner, the indented pattern is formed along the length of the continuous ribbon 102 in the first edge region 114. The indented pattern comprises a series of webs separated from one another by a series of intermediate segments as shown in FIG. 3. The series of webs comprises a series of thinned regions separated from one another by the intermediate segments that are thicker than the webs. Each web is thinner than the adjacent intermediate segments. In this manner, the thickness of the first edge region 114 of the continuous ribbon 102 is selectively reduced at the positions of the webs. Thus, in some embodiments, the thickness of the bead extending along the length of the first edge region 114 of the continuous ribbon 102 is selectively reduced. Selectively reducing the thickness of the first edge region 114 can aid in severing the continuous ribbon 102 to separate a sheet from the continuous ribbon. For example, in some embodiments, the force required to break the first edge region 114 of the continuous ribbon 102 at a relatively thin web is less than the force required to break the first edge region at a relatively thick intermediate segment or the force that would be required to break the first edge region without the indented pattern.

In some embodiments, the first series of indentations is formed in the first cladding layer 106 of the continuous ribbon 102, and the second series of indentations is formed in the second cladding layer 108 of the continuous ribbon. In some embodiments, the depths of the indentations of the first series of indentations are sufficiently small that the indentations do not extend into the core layer 104 of the continuous ribbon 102. Additionally, or alternatively, the depths of the indentations of the second series of indentations are sufficiently small that the indentations do not extend into the core layer 104 of the continuous ribbon 102. In this manner, the core layer 104 is substantially non-indented along the length of the first edge region 114 of the continuous ribbon 102. In some of such embodiments, the core layer 104 remains unexposed at the first surface 110 and/or the second surface 112 of the continuous ribbon 102 along the length of the first edge region 114 after formation of the indented pattern along the length of the first edge region. In other words, the core layer 104 remains covered by the first cladding layer 106 and/or the second cladding layer 108 at the first surface 110 and/or the second surface 112, respectively, of the continuous ribbon 102 along the length of the first edge region 114 after formation of the indented pattern along the length of the first edge region. Maintaining coverage of the core layer 104, which can be in tension as described above, can aid in maintaining the integrity of the continuous ribbon 102 and/or avoiding unintended breakage of the continuous ribbon during processing.

In other embodiments, the depths of the indentations are sufficiently large that the indentations extend into the core layer 104 of the continuous ribbon 102. Additionally, or alternatively, the depths of the indentations of the second series of indentations are sufficiently large that the indentations extend into the core layer 104 of the continuous ribbon 102. In this manner, the core layer 104 is indented along the length of the first edge region 114 of the continuous ribbon 102. In some of such embodiments, the core layer 104 is exposed at the first surface 110 and/or the second surface 112 of the continuous ribbon 102 along the length of the first edge region 114 after formation of the indented pattern along the length of the first edge region. In other words, the core layer 104 is uncovered by the first cladding layer 106 and/or the second cladding layer 108 at the first surface 110 and/or the second surface 112, respectively, of the continuous ribbon 102 along the length of the first edge region 114 after formation of the indented pattern along the length of the first edge region. In some of such embodiments, portions of the core layer 104, which can be in tension as described above, are exposed along the first edge region 114. The webs can comprise the exposed portions, which can further weaken the webs to aid in severing the bead extending along the first edge region to sever the continuous ribbon 102.

Figure 4:
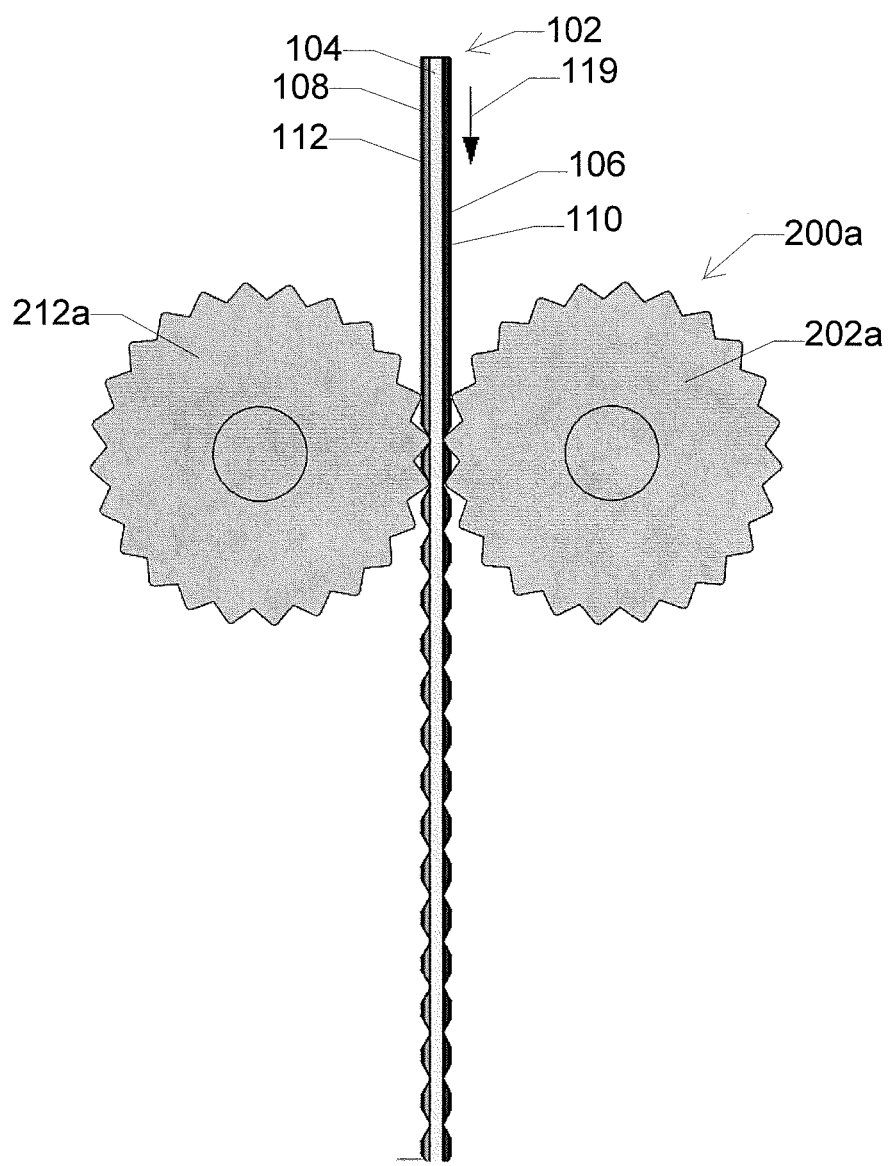
FIG. 4 is a cross sectional view of one exemplary embodiment of a pair of patterning members engaged with a glass ribbon taken along line 4-4 of FIG. 1.

In some embodiments, the patterning unit 200 comprises a third patterning member 202a and a fourth patterning member 212a as shown in FIGS. 1 and 4. The third patterning member 202a and the fourth patterning member 212a are configured and arranged similarly to the first patterning member 202 and the second patterning member 212, respectively. The third patterning member 202a and the fourth patterning member 212a are positioned to engage the second edge region 116 of the continuous ribbon 102. Upon passage of the continuous ribbon 102 between the third patterning member 202a and the fourth patterning member 212a, the third patterning member engages the first surface 110 of the continuous ribbon to form a third series of indentations longitudinally along the length of the continuous ribbon in the second edge region 116, and the fourth patterning member engages the second surface 112 of the continuous ribbon to form a fourth series of indentations longitudinally along the length of the continuous ribbon in the second edge region.

In some embodiments, the third patterning member 202a and the fourth patterning member 212a are synchronized such that the third series of indentations and the fourth series of indentations are aligned with one another (e.g., in the longitudinal and/or transverse directions). The continuous ribbon 102 is passed between the third patterning member 202a and the fourth patterning member 212a to form an indented pattern along the length of the second edge region 116 of the continuous ribbon 102. In some embodiments, the indented pattern comprises a series of webs separated from one another by a series of intermediate segments. The thickness of the second edge region 116 of the continuous ribbon 102 is selectively reduced as similarly described with reference to the first patterning member 202 and the second patterning member 212.

In some embodiments, the first and second series of indentations are aligned with the third and fourth series of indentations in the transverse direction (e.g., horizontally aligned). In other words, the first and second series of indentations are at substantially the same longitudinal positions as the third and fourth series of indentations. In this manner, each web of the indented pattern formed in the first edge region 114 is at substantially the same longitudinal position (e.g., horizontally aligned) as a corresponding web of the indented pattern formed in the second edge region 116. This can aid in severing the continuous ribbon 102 to separate the sheet therefrom.

In some embodiments, passing the continuous ribbon 102 through the patterning unit 200 comprises passing the continuous ribbon between the first patterning member 202 and the second patterning member 212 and between the third patterning member 202a and the fourth patterning member 212a as shown in FIG. 1. The first patterning member 202 and the second patterning member 212 engage the continuous ribbon 102 along the first edge region 114 to form the indented pattern along the length of the first edge region. Thus, the thickness of the first edge region 114 of the continuous ribbon 102 is selectively reduced by the patterning unit 200. The third patterning member 202a and the fourth patterning member 212a engage the continuous ribbon 102 along the second edge region 116 to form the indented pattern along the length of the second edge region. Thus, the thickness of the second edge region 116 of the continuous ribbon 102 is selectively reduced by the patterning unit 200. In some embodiments, the indented patterns are formed in the first edge region 114 and the second edge region 116 of the continuous ribbon 102 substantially simultaneously as shown in FIG. 1.

In some embodiments, the central region 118 of the continuous ribbon 102 remains substantially unengaged by the patterning unit 200. For example, the central region 118 remains substantially unengaged by the first patterning member 202, the second patterning member 212, the third patterning member 202a, and/or the fourth patterning member 212a. In this manner, the central region 118 is substantially unindented by the patterning unit 200 during formation of the indented patterns in the first edge region 114 and the second edge region 116. This can aid in maintaining the first surface 110 and the second surface 112 of the continuous ribbon 102 in a pristine condition along the central region 118 for use in making a glass article.

In some embodiments, the continuous ribbon 102 is severed to separate a sheet from the continuous ribbon. For example, the continuous ribbon 102 is severed at a position downstream from the patterning unit 200. In some embodiments, a stress region (e.g., a score) is formed in the continuous ribbon. A score 117 can be formed in the continuous ribbon 102 and can extend in the transverse direction. For example, in some embodiments, the score 117 extends along substantially the entire width of the central region 118 of the continuous ribbon 102 as shown in FIG. 1. The score 117 can be substantially linear (i.e., straight) or non-linear (i.e., curved). The score 117 can be formed using any suitable scoring technique (e.g., mechanical scoring or laser scoring).

In some embodiments, the score 117 extends between the first edge region 114 and the second edge region 116 of the continuous ribbon 102 as shown in FIG. 1 to form a scored region. A stress can be applied to the continuous ribbon 102 near the scored region, for example, by applying a bending force to the continuous ribbon proximate the scored region, cooling the scored region of the continuous ribbon, heating the scored region of the continuous ribbon, or any other suitable method. Upon application of the stress to the continuous ribbon 102, the central region 118 of the continuous ribbon severs along the score 117. For example the continuous ribbon 102 fractures or breaks along the scored region in response to application of the stress.

In some embodiments, the first edge region 114 of the continuous ribbon 102 severs at a web disposed near the score 117 (e.g., by fracturing the first edge region at the web). Additionally, or alternatively, the second edge region 116 of the continuous ribbon 102 severs at a web disposed near the score 117 (e.g., by fracturing the second edge region at the web). In some embodiments, the first edge region 114 and/or the second edge region 116 tend to break at a web instead of breaking at an intermediate segment disposed between adjacent webs (e.g., because the web is thinner than the adjacent intermediate segment). Selectively reducing the thickness of the first edge region 114 and/or the second edge region 116 can aid in directing the break laterally across the respective beads upon severing the continuous ribbon 102. This can aid in forming a substantially straight cut across the width of the continuous ribbon 102 and/or preventing an undirected or wandering break from forming along the length and width of the edge regions. Selectively reducing the thickness of the first edge region 114 and/or the second edge region 116 can aid in reducing the force required to break the respective beads upon severing the continuous ribbon 102. For example, in some embodiments, the webs of the indented patterns formed in the first edge region 114 and/or the second edge region 116 are thinner than the respective beads without the indented patterns formed therein. The reduced thickness of the first edge region 114 and/or the second edge region 116 can reduce the force required to break the respective edge regions at the webs. Reducing the force required to break the beads can reduce the movement of the continuous ribbon 102 caused by application of the force. This can aid in preventing defects that can result from movement of the continuous ribbon during the severing process.

In some embodiments, the continuous ribbon 102 is severed as described above to separate the sheet from the continuous ribbon. The first edge region 114 and/or the second edge region 116 can be removed from the sheet. For example, in some embodiments, the first edge region 114 and the second edge region 116 are removed from the sheet to leave the central region 118. The first and/or second edge regions can be removed by any suitable method such as, for example, forming a stress region extending longitudinally along the sheet between the respective edge region and the central region and severing the sheet along the stress region.

Figure 5:
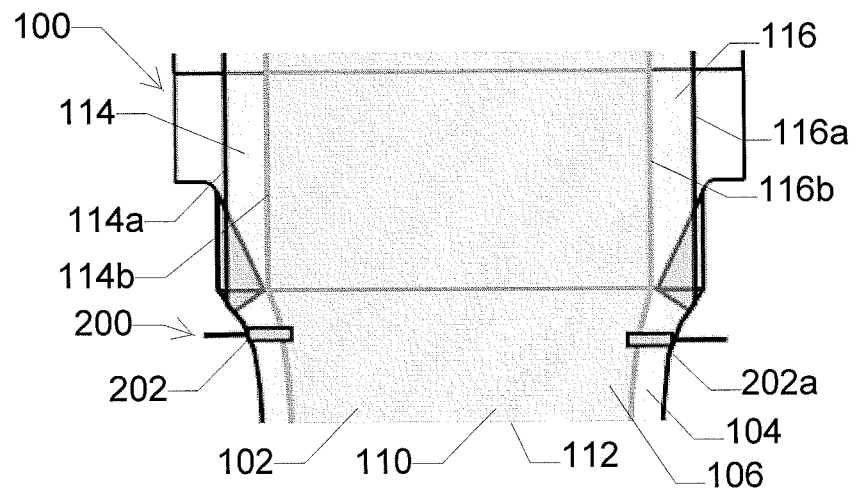
FIG. 5 is an elevation view of one exemplary embodiment of a system for forming a glass ribbon.

In some embodiments, the core layer 104 is partially uncovered by the first cladding layer 106 and/or the second cladding layer 108 of the continuous ribbon 102 as shown in FIG. 5. For example, in some of such embodiments, the core layer 104 is wider than the first cladding layer 106 and/or the second cladding layer 108 such that the core layer is uncovered along the first surface 110 and/or the second surface 112 of the continuous ribbon 102 at the first edge region 114 and/or the second edge region 116. In some of such embodiments, the first edge region 114 comprises a plurality of beads. For example, a first bead 114a extends along an edge of the core layer 104, and a second bead 114b extends along an edge of the first cladding layer 106 and the second cladding layer 108 as shown in FIG. 5. In this manner, the first bead 114a extends longitudinally along the length of an outer edge of the first edge region 114, and the second bead 114b extends longitudinally along the length of an inner edge of the first edge region. Additionally, or alternatively, the second edge region 116 comprises a plurality of beads. For example, a first bead 116a extends along an edge of the core layer 104, and a second bead 116b extends along an edge of the first cladding layer 106 and the second cladding layer 108 as shown in FIG. 5. In this manner, the first bead 116a extends longitudinally along the length of an outer edge of the second edge region 116, and the second bead 116b extends longitudinally along the length of an inner edge of the second edge region. In other embodiments, the continuous ribbon comprises a single bead extending longitudinally along the uncovered region of the core layer in the first edge region (e.g., longitudinally along the length of the outer edge or the inner edge of the first edge region) and/or a single bead extending longitudinally along the uncovered region of the core layer in the second edge region (e.g., longitudinally along the length of the outer edge or the inner edge of the second edge region).

In other embodiments, the first edge region and/or the second edge region can comprise a greater number of beads. For example, in some embodiments, the first cladding layer and the second cladding layer have different widths such that the first edge region and/or the second edge region comprises a bead extending along an edge of each of the core layer, the first cladding layer, and the second cladding layer. In other embodiments, the continuous ribbon comprises one or more intermediate layers having different widths than the core layer, the first cladding layer, and the second cladding layer such that the first edge region and/or the second edge region comprises a bead extending along edges of the intermediate layers.

In some embodiments, the patterning unit 200 engages the first edge region 114 and the second edge region 116 of the continuous ribbon 102 as shown in FIG. 5. The patterning unit 200 engages substantially the entire width of the uncovered region of the core layer 102 in the first edge region 114 and/or the second edge region 116. For example, the patterning unit 200 engages the first edge region 114 along substantially the entire width of the first edge region. To that end, the length of each of the first patterning member 202 and the second patterning member 212 is at least as long as the width of the first edge region 114. In some embodiments in which the first edge region 114 comprises more than one bead, upon passage of the continuous ribbon 102 between the first patterning member 202 and the second patterning member 212, each of the first patterning member and the second patterning member engages both the first bead 114a and the second bead 114b of the first edge region 114. In this manner, the thicknesses of both the first bead 114a and the second bead 114b are selectively reduced by the patterning unit 200 (e.g., by forming the indented pattern). Similarly, in some embodiments in which the second edge region 116 comprises more than one bead, the patterning unit 200 engages the second edge region 116 along substantially the entire width of the second edge region. To that end, the length of each of the third patterning member 202a and the fourth patterning member 212a is at least as long as the width of the second edge region 116. Upon passage of the continuous ribbon 102 between the third patterning member 202a and the fourth patterning member 212a, each of the third patterning member and the fourth patterning member engages both the first bead 116a and the second bead 116b of the second edge region 116 to selectively reduce the thicknesses of both the first bead and the second bead.

In any of the embodiments described herein, the projections of the patterning members can be sized and shaped to form indentations having a desired size and shape. For example, in some embodiments, the projections are substantially V-shaped as shown in FIG. 3 with reference to the first patterning member 202 and the second patterning member 212. Engagement of the continuous ribbon 102 with such a V-shaped projection forms a substantially V-shaped indentation in the surface of the continuous ribbon. In other words, the indentation is configured as a channel or a groove having a V-shaped cross sectional shape. The V-shaped indentation comprises two angled sidewalls converging at a point. In some embodiments, the point is rounded. The web is disposed between the point of one indentation and the point of a corresponding indentation. In other embodiments, the projections and the cross sections of the indentations formed by the projections can have any other suitable shape such as, for example, U-shaped or rectangular.

In any of the embodiments described herein, the projections of the patterning members and/or the indentations formed in the continuous ribbon can be spaced from one another by any suitable distance. For example, in some embodiments, the patterning members comprise from about 4 projections per in to about 12 projections per in or about 6 projections per in to about 10 projections per in. Similarly, in some embodiments, the indented pattern comprises from about 4 indentations per in to about 12 indentations per in or about 6 indentations per in to about 10 indentations per in. The spacing can depend on the amount of thinning of the edge region (i.e., the difference between the web thickness and the initial thickness of the edge region). For example, the spacing can be greater when the amount of thinning is greater to leave sufficient space between webs for the displaced material.

Although the patterning members illustrated in FIGS. 1 and 3-5 comprise a plurality of protrusions extending from an outer surface of a roller body, other embodiments are included within the scope of this disclosure. In other embodiments, the patterning members can comprise any type of protrusion configured to engage the continuous ribbon to selectively thin a portion of the continuous ribbon. For example, the patterning members can be configured as substantially flat, elongate members (e.g., paddle members) configured to move in forward and backward directions to repeatedly engage and disengage the continuous ribbon to form a series of indentations in the continuous ribbon. In some embodiments, the patterning members are longitudinally movable with the continuous ribbon (e.g., in the direction 119 at the velocity v). This can minimize the movement in the continuous ribbon as a result of being pinched between the patterning members to form the indentations in the continuous ribbon.

It will be apparent to those skilled in the art that various modifications and variations can be made without departing from the spirit or scope of the invention. Accordingly, the invention is not to be restricted except in light of the attached claims and their equivalents.

What is claimed is:

1. A method comprising:
forming a continuous ribbon of glass, the continuous ribbon comprising a first surface, a second surface opposite the first surface, a first edge region, a second edge region opposite the first edge region, and a central region extending between the first edge region and the second edge region, each of the first edge region and the second edge region comprising a greater thickness than the central region of the continuous ribbon, the continuous ribbon comprising a laminate structure comprising a core layer disposed between a first cladding layer and a second cladding layer, wherein the core layer is wider than at least one of the first cladding layer or the second cladding layer such that the core layer comprises an uncovered portion that is uncovered by the at least one of the first cladding layer or the second cladding layer;
forming an indented pattern longitudinally in the first edge region of the continuous ribbon by forming a first series of indentations in the first surface of the continuous ribbon and forming a second series of indentations in the second surface of the continuous ribbon, the indented pattern comprising intermediate segments interconnected with one another by webs, wherein each intermediate segment is thicker than adjacent webs, wherein the indented pattern extends across substantially the entire width of the uncovered portion of the core layer; and
separating a sheet from the continuous ribbon, wherein the separating the sheet comprises fracturing the first edge region at a web of the indented pattern formed in the first edge region and fracturing the second edge region at a web of the indented pattern formed in the second edge region.

2. The method of claim 1, wherein the first series of indentations is formed in the first cladding layer and the second series of indentations is formed in the second cladding layer.

3. The method of claim 1, wherein the forming the indented pattern comprises passing the first edge region of the continuous ribbon between a first patterning roller and a second patterning roller each comprising a series of protrusions engaging the continuous ribbon, the first patterning roller and the second patterning roller are synchronized such that, upon rotation of the first patterning roller and the second patterning roller, the protrusions of the first patterning roller and the protrusions of the second patterning roller engage the first surface and the second surface, respectively, of the continuous ribbon at substantially the same transverse and longitudinal positions to align the first series of indentations and the second series of indentations with one another.

4. The method of claim 1, wherein the forming the indented pattern comprises pinching the first edge region of the continuous ribbon between a first patterning member and a second patterning member, the first patterning member and the second patterning member movable toward one another to engage the first surface and the second surface, respectively, of the continuous ribbon at substantially the same transverse and longitudinal positions.

5. The method of claim 1, wherein the fracturing comprises:
forming a stress region extending at least partially across the central region of the continuous ribbon; and
applying a stress to the continuous ribbon to sever the stress region of the continuous ribbon.

6. The method of claim 5, wherein the forming the stress region comprises scoring the central region of the continuous ribbon to form a scored region extending at least partially between the first edge region and the second edge region.

7. The method of claim 5, wherein the applying the stress to the continuous ribbon comprises applying a bending force to the continuous ribbon proximate the stress region.

8. The method of claim 5, wherein the applying the stress to the continuous ribbon comprises cooling the stress region of the continuous ribbon.

9. The method of claim 1, wherein each web of the indented pattern is disposed between one indentation of the first series of indentations and a corresponding indentation of the second series of indentations.

10. The method of claim 1, further comprising forming a second indented pattern longitudinally in the second edge region of the continuous ribbon by forming a third series of indentations in the first surface of the continuous ribbon and forming a fourth series of indentations in the second surface of the continuous ribbon, the second indented pattern comprising intermediate segments interconnected with one another by webs, wherein each intermediate segment is thicker than adjacent webs.

11. The method of claim 10, wherein each web of the indented pattern formed in the first edge region is at substantially the same longitudinal position on the continuous ribbon as a corresponding web of the second indented pattern formed in the second edge region.

12. The method of claim 1, wherein each of the first cladding layer and the second cladding layer has a lower average coefficient of thermal expansion than the core layer such that, upon cooling of the continuous ribbon, a compressive stress forms in each of the first cladding layer and the second cladding layer and a tensile stress forms in the core layer.

13. A method comprising:
forming a continuous ribbon of glass, the continuous ribbon comprising a laminate structure comprising a core layer disposed between a first cladding layer and a second cladding layer, wherein the core layer is wider than at least one of the first cladding layer or the second cladding layer such that the core layer comprises an uncovered portion that is uncovered by the at least one of the first cladding layer or the second cladding layer;
passing a first edge region of the continuous ribbon between a first patterning roller and a second patterning roller, each of the first patterning roller and the second patterning roller comprising a series of protrusions successively engaging the continuous ribbon as the continuous ribbon is passed between the first patterning roller and the second patterning roller, the first patterning roller and the second patterning roller being synchronized such that each protrusion of the first patterning roller engages the first cladding layer of the continuous ribbon at substantially the same longitudinal position on the continuous ribbon as a corresponding protrusion of the second patterning roller engages the second cladding layer of the continuous ribbon to form an indented pattern longitudinally along the first edge region of the continuous ribbon, the indented pattern comprising intermediate segments interconnected with one another by webs, wherein the indented pattern extends across substantially the entire width of the uncovered portion of the core layer; and
separating a sheet from the continuous ribbon, wherein the separating the sheet comprises fracturing the first edge region at a web of the indented pattern formed in the first edge region.

14. The method of claim 13, further comprising passing a second edge region of the continuous ribbon between a third patterning roller and a fourth patterning roller, each of the third patterning roller and the fourth patterning roller comprising a series of protrusions successively engaging the continuous ribbon as the continuous ribbon is passed between the third patterning roller and the fourth patterning roller, the third patterning roller and the fourth patterning roller being synchronized such that each protrusion of the third patterning roller engages the first cladding layer of the continuous ribbon at substantially the same longitudinal position on the continuous ribbon as a corresponding protrusion of the fourth patterning roller engages the second cladding layer of the continuous ribbon to form a second series of thinned regions extending along the length of the second edge region of the continuous ribbon.

* * * * *